(12) United States Patent
Lee et al.

(10) Patent No.: US 8,830,243 B2
(45) Date of Patent: Sep. 9, 2014

(54) SYSTEM AND METHOD FOR MAKING EMOTION BASED DIGITAL STORYBOARD

(75) Inventors: Won-Hyoung Lee, Seoul (KR); Kil-Sang Yoo, Seoul (KR)

(73) Assignee: Chung-Ang University Industry-Academy Cooperation Fdn., Dongjak-Gu, Seoul (KR)

( * ) Notice: Subject to any disclaimer, the term of this patent is extended or adjusted under 35 U.S.C. 154(b) by 90 days.

(21) Appl. No.: 12/446,861

(22) PCT Filed: Jul. 15, 2008

(86) PCT No.: PCT/KR2008/004143
§ 371 (c)(1),
(2), (4) Date: Apr. 23, 2009

(87) PCT Pub. No.: WO2009/093784
PCT Pub. Date: Jul. 30, 2009

(65) Prior Publication Data
US 2011/0080410 A1  Apr. 7, 2011

(30) Foreign Application Priority Data

Jan. 25, 2008 (KR) .................. 10-2008-0008072

(51) Int. Cl.
  *G06T 13/00* (2011.01)
  *G06T 11/00* (2006.01)
(52) U.S. Cl.
  CPC ..................... *G06T 11/00* (2013.01)
  USPC ........................................................ 345/473
(58) Field of Classification Search
  USPC .......................................... 345/473; 707/825
  See application file for complete search history.

(56) References Cited

U.S. PATENT DOCUMENTS

| | | | |
|---|---|---|---|
| 6,545,682 B1* | 4/2003 | Ventrella et al. | 345/473 |
| 7,248,270 B1* | 7/2007 | Boylan | 345/679 |
| 2003/0117485 A1* | 6/2003 | Mochizuki et al. | 348/14.01 |
| 2006/0023923 A1* | 2/2006 | Geng et al. | 382/116 |
| 2006/0149781 A1* | 7/2006 | Blankinship | 707/103 R |
| 2008/0007567 A1* | 1/2008 | Clatworthy et al. | 345/619 |
| 2009/0003794 A1* | 1/2009 | Heatherly et al. | 386/52 |

FOREIGN PATENT DOCUMENTS

KR  10-2002-0038618  5/2002
KR  10-2007-0120706  12/2007

OTHER PUBLICATIONS

Shim, Youn-Sook, "A Study on the Emotional Interface Design Using User Interaction," Korea Society of Design Science, 2003 Spring Conference Proceeding; ISSN 1226-8046, May 2003, pp. 270-271.
Kwang, Tae Jung, "Sensibility and Preference Evaluation for Character Design," Journal of the Ergonomics Society of Korea, Feb. 2007, vol. 26, No. 1, pp. 63-69, ISSN 1229-1684.

* cited by examiner

*Primary Examiner* — Maurice L McDowell, Jr.
*Assistant Examiner* — Kyle Zhai
(74) *Attorney, Agent, or Firm* — IPXLAW Group LLP; Claude A. S. Hamrick

(57) ABSTRACT

A system and a method for generating a digital storyboard in which characters with various emotions are produced. The digital storyboard generating system includes an emotion-expressing character producing unit to produce an emotion-based emotion-expressing character, and a storyboard generating unit to generate storyboard data using the emotion-expressing character. Optionally, cartoon-rendering is performed on the storyboard data to generate an image, where the image is output to the user.

13 Claims, 4 Drawing Sheets

SYSTEM AND METHOD FOR MAKING EMOTION BASED DIGITAL STORYBOARD

TECHNICAL FIELD

The present invention relates to a method and a system for generating an emotion-based digital storyboard, and particularly to a method and a system for generating a digital storyboard in which characters with various emotions are produced.

BACKGROUND ART

A storyboard expresses an image to be delivered as an illustration according to a sequence, illustrates a motion of a camera and a motion of a subject for each scene by visualizing the image to be presented to an audience and a customer, such as displaying a motion of a character, a role, a scene change, the motion of the camera, and the like, before filming, and also expresses a story and how to make a film through an illustration to explain everything for making the film, just like a design drawing. That is, it is a pre-production process that visualizes everything in a scenario in detail, which is a scene design drawing, and at the same time, is a production manual in which a predetermined place and situation, a role of the character, a motion and a timing, a music and sound effects, a scene change method, a filming method, and the like are written all together aiming at a scene intended by a director.

Typically, a completed storyboard includes the information that all staffs, such as a producer, a director, an art director, and the like, may use to understand how to construct the corresponding story. The director may write about from connectivity of a short and a sequence to details, such as how to create a space, a line of flow of the character, a type of a camera and a location of the camera, an intensity and a color of light, locations of props, a script, a sound effect, an atmosphere of the scene, a time, and the like.

Important activities associated with the storyboard include maintaining the scene written in words and directing based on the decision on how to divide scenes and how to assign determined scenes. There is the need for careful attention not to forget intension, direction, and connectivity, although the strength and weakness of each scene is of great consequence.

A carefully drafted storyboard enables various problems that may otherwise occur in a project production, to be predicted and corrected in advance. As an example, when a storyboard indicates that a specific short is impossible due to an excessively high cost, the short may be changed to a practical short. Accordingly, a role of the storyboard in the pre-production is to help estimating a precise budget and help staff to recognize and understand an idea based on consensus on the concept of a work.

In general, manually drafted storyboards lack both spatial and temporal efficiencies in expressing an image. The image is mainly used to effect an illusion of motion, and spatially sequential motion over time. The storyboard may include information of a scene and a motion that are displayed on a screen, information of the presence of an actor on the screen, and information of other actions and a motion of a transfer that may affect the flow of a sequence. Accordingly, the storyboard is required to include complex motions of a character and a camera. However, since the complex motions are illustrated in a certain storyboard standard, the conventional storyboard may not be able to fully visualize the director's idea. Also, there is a burden of re-drawing when a stage set and a character are to be composed and corrected.

Due to the described weak points of the conventional storyboard, there is a need for a digital storyboard having a capability to illustrate details of each scene, such as a background, a motion, a frame setup, a motion of a camera, and the like, in a film drawing. Accordingly, a system and a method for producing and using a character that expresses detailed emotions desired by the user in the digital storyboard is required.

SUMMARY OF THE INVENTION

An aspect of the present invention provides a storyboard generating method and system that may simply and easily write a storyboard, using a computer, and may enable a user to setup a facial expression and a pose of the character, thereby making detailed facial expression and pose.

An aspect of the present invention provides a storyboard generating method and system that may perform cartoon-rendering of a storyboard generated by a user to output a cartoon-like mage, thereby outputting an outcome similar to a manually drafted storyboard.

An aspect of the present invention provides a storyboard generating method and system that may convert a storyboard generated by a user into various file formats to store, and thus, the storyboard may be read in various environments including a web.

In an aspect of the present invention, there may be provided a system for generating a storyboard, the method including an emotion-expressing character producing unit to produce an emotion-based emotion-expressing character, and a storyboard generating unit to generate storyboard data using the emotion-expressing character.

In an aspect of the present invention, the emotion-expressing character producing unit may include at least one of an emotional facial expression producing unit to produce a facial expression of the emotion-expressing character and an emotional pose producing unit to produce a pose of the emotion-expressing character.

In an aspect of the present invention, the system may further include a cartoon producing unit to perform cartoon-rendering of the generated storyboard data, and an output unit to output the cartoon.

In an aspect of the present invention, the system may further include a file converting unit to convert the generated storyboard data into one or more file formats, and a file storage unit to store the converted file.

In an aspect of the present invention, there may be provided a method for generating a storyboard, the method including producing an emotion-based emotion-expressing character, and generating storyboard data using the emotion-expressing character.

In an aspect of the present invention, the producing of the emotion-expressing character may include at least one of producing of an emotional facial expression of the emotion-expressing character and producing of an emotional pose of the emotion-expressing character.

In an aspect of the present invention, the method may further include performing cartoon-rendering of the generated storyboard data and outputting the cartoon.

In an aspect of the present invention, the method may further include converting the generated storyboard data into one or more file formats, and storing the converted file.

According to an aspect of the present invention, when various facial expression data and pose data are generated and stored in advance and a user selects and drags an icon representing a motion to write a digital storyboard, the user who does not have background knowledge about direction may directly and easily write the storyboard.

According to an aspect of the present invention, a storyboard enables a user to setup a facial expression and a pose of a character, thereby making a detailed facial expression and pose.

According to an aspect of the present invention, a storyboard performs cartoon-rendering of a storyboard generated by a user to output an image like a cartoon, thereby outputting an outcome similar to a handwritten storyboard.

According to an aspect of the present invention, a storyboard converts a storyboard generated by a user into various file formats to store, and thus, the storyboard may be read in various environments including a web.

BEST MODE FOR CARRYING OUT THE INVENTION

Figure 1:
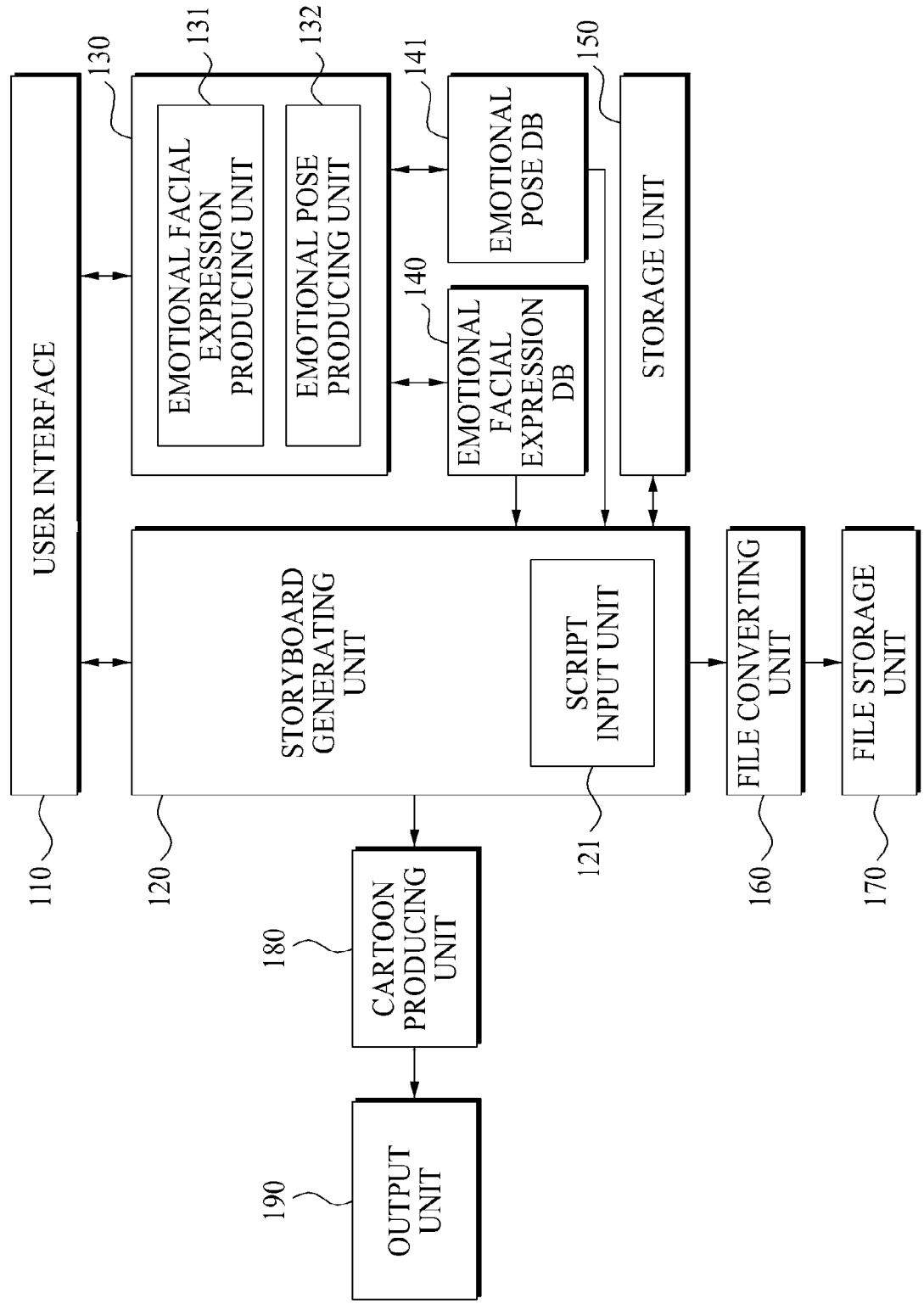
FIG. 1 shows a block diagram of a digital storyboard generating system according to one embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 shows a block diagram of a digital storyboard generating system according to one embodiment of the present invention. As depicted in FIG. 1, the digital storyboard generating system includes a user interface 110, a storyboard generating unit 120, an emotional-expressing character producing unit 130, an emotional facial expression database (DB) 140, an emotional pose DB 141, a storage unit 150, a file converting unit 160, a file storage unit 170, a cartoon producing unit 180, and an output unit 190.

The user interface 110 provides an interface to receive a user command to generate a storyboard. In this instance, at least one of a keyboard, a touch screen, a mouse, a tablet, and the like may be used as the user interface. As an example, the user may select a character, a background, clothes, props, and the like via the user interface, and may generate the storyboard by arranging the selected items in a creation window of the storyboard using drag and drop.

The emotion-expressing character producing unit 130 may produce a detailed facial expression, pose, and the like, by enabling the user to select a facial expression, a pose, and the like, stored in advance in a database. That is, the user may compose the storyboard by extracting the character stored in the database as is, and may also compose the storyboard by changing the stored character and producing a desired emotion-expressing character. In this instance, the user may change and store a color of the clothes, and may also direct a facial expression and a pose of the character as the user desires. Accordingly, the emotion-expressing character producing unit 130 may include an emotional facial expression producing unit 131 and an emotional pose producing unit 132.

In this instance, the emotional facial expression producing unit 131 is able to select a precise facial expression and generate an emotional facial expression as the user desires. The emotional facial expression producing unit 131 may read emotional facial expression data of the character stored in advance in the emotional facial expression DB 140 and may produce a desired facial expression by manipulating eyebrows, eyes, a nose, a mouth, and the like of the character based on the read data. As an example, to produce a surprised look, raising a position of the eyebrows, making a mouth small, lengthen a lower jaw, and taking edges of the eyebrows down may be performed, thereby an appropriate facial expression is produced. The emotion facial expression producing unit 131 will be described in detail with reference to FIG. 4.

The emotional pose producing unit 132 is able to closely select a pose of the character and generate an emotional pose as the user desires. The emotional pose producing unit 131 may read emotional pose data of the character stored in advance in the emotional pose DB 141 and may produce a desired pose by manipulating hands, feet, a head, and the like of the character based on the read data. In this instance, the pose of the character may be variously directed in a variety of angles based on three dimensions (3D).

The storage unit 150 may store layout data with respect to an emotion-expressing character and camera setup data set by the user, and may store subsidiary image data including at least one of background data, clothing data, and prop data.

That is, the storage unit 150 stores the subsidiary image data, such as the background data, clothing data, prop data, and the like, required for generating the storyboard, and enables to user to extract and to use the data when the user produces the storyboard. Also, the storage unit 150 stores the layout data of the emotion-expressing character generated according to a facial expression or pose setup information inputted by the user, and stores camera setup data by receiving a coordinate value for reproducing the facial expression or the pose and a setup value with respect to an angle inputted by the user. In this instance, the storage unit 150 may support a suitable image format, such as, bmp, gif, jpeg, png, psd, tiff, and the like, and may enable the selected image to be arranged. Also, the storage unit 150 may provide a user-defined expanding function in a panel, and thus, the user may directly add a background image and may use the background image in the storyboard. Also, the storage unit 150 may store and load each cut or a project of the storyboard.

The storyboard generating unit 120 generates the storyboard by combining the emotion-expressing character data extracted by the user and the subsidiary image data, such as the background, properties, and the like. In this instance, the storyboard generating unit 120 may include a script input unit 121 that receives script data to be included in the storyboard, inputted by the user. That is, the user may generate the storyboard by compounding the extracted emotion-expressing character data and the subsidiary image data, together with the script data. Also, the storyboard generating unit 120 may decode, into a 3D object, data selected by the user, such as facial expression, a motion of a character, a background, an indication of switching a camera, clothes, props, and the like. Accordingly, the data which is decoded into the 3D object may be arranged in the storyboard window and may be produced as a 3D screen.

When the user desires to convert a completed storyboard to store the same, the file converting unit 160 may convert the storyboard in various file formats. In this instance, the converted filed may be stored in a file storage unit 170. That is, the storyboard may be converted into various file formats such as ASCII, HTML, XML, and the like, and also the user may convert the data into a file format that is directly readable from a web.

The cartoon producing unit 180 performs cartoon-rendering to output a cartoon-like image, when the user desires to print out the completed storyboard. In this instance, a cartoon-rendering process is a process of converting storyboard data generated from the storyboard generating unit 120 into a storyboard similar to a real storyboard, to thereby output the storyboard data as an image like a cartoon. That is, when the user desires to print out the storyboard data, the cartoon producing unit 180 may perform cartoon-rendering of the storyboard data to make the storyboard data be similar to handwritten storyboard data, and outputs the rendered data via the output unit 190, thereby reducing confusion of the user caused by a difference between a conventional storyboard and the output. In this instance, a page layout function may be provided, the page layout function providing a preview before printing out the completed storyboard.

Figure 2:
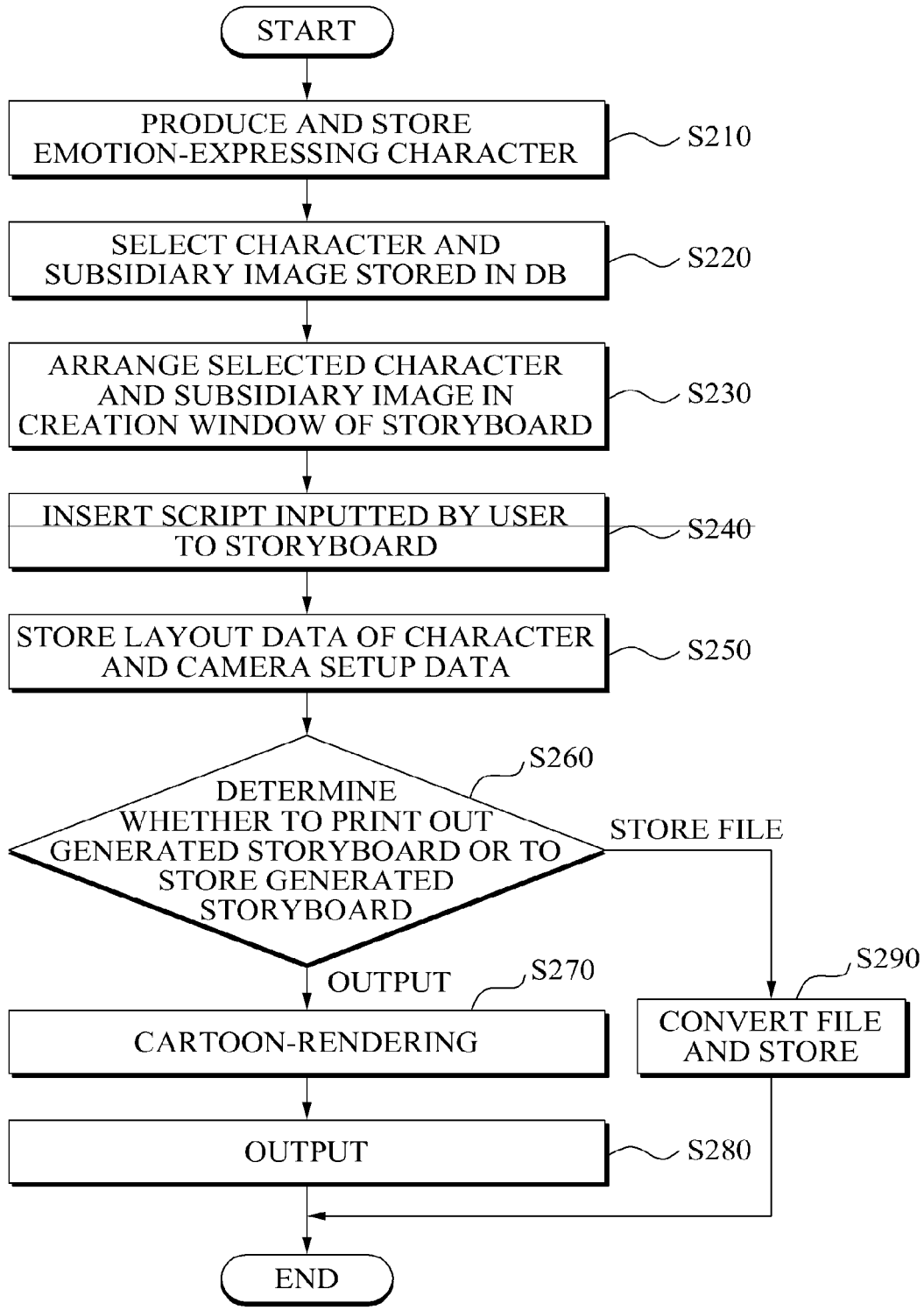
FIG. 2 shows a flowchart illustrating exemplary steps to generate a digital storyboard according to one embodiment of the present invention.

FIG. 2 shows a flowchart illustrating exemplary steps to generate a digital storyboard according to one embodiment of the present invention.

In operation S210, a user may produce and store an emotion-expressing character. That is, the user may compose the storyboard using the character stored in advanced in a database without change, and may compose the storyboard by setting a facial expression, a motion, and the like to express emotion of the character according to an intension of the user.

A process of operation S210 will be described in detail with reference to FIG. 3 later.

In operation S220, the user may select a character and a subsidiary image such as a background, props, clothes, and the like from the database. That is, to compose the storyboard, the user may select either character data stored in advance in the database or character data set by the user in operation S210, and may select the subsidiary image such as the background, the props, the clothes, and the like stored in the storage unit 150.

In operation S230, the user may arrange the selected character and subsidiary image in a creation window of the storyboard. In this instance, the user may arrange the character and the subsidiary image at a desired position by merely using drag and drop. Also, the character and the subsidiary image may be decoded into a 3D object, and thus a screen may be composed in a 3D format.

In operation S240, to compose the storyboard containing a script, the digital storyboard may receive script data inputted by the user and insert the script data into the storyboard. That is, the 3D images appropriately arranged by the user according to a scenario may be re-arranged by combining with the script data inputted by the user via a script input unit.

In operation S250, layout data of the character and camera setup data are stored. That is, the digital storyboard may store the layout data of the emotion-expressing character generated according to a facial expression or pose setup information inputted by the user, and may store the camera setup data by receiving a coordinate value for reproducing the facial expression or the pose and a setup value with respect to an angle inputted by the user.

In this instance, various camera presets, such as 4:3 and 16:9, and a change of an image resolution according to an application medium, are supported, thereby supporting various functions directly related to an animation or a movie.

In operation S260, when the storyboard is generated, it is determined whether to print out the generated storyboard or to store the generated storyboard.

If the generated storyboard is determined to be printed out, cartoon-rendering may be performed to printed out an image like a cartoon in operation S270. The cartoon-rendering is a process of rendering the storyboard as a cartoon image similar to a real handwritten storyboard data, when the user desires to print out the storyboard data.

Accordingly, when the cartoon-rendering is completed in operation S270, the cartoon-rendered image is printed out in operation S280.

If, in operation S260, the generated storyboard is determined to be stored, the storyboard data may be converted in various file formats in operation S290. That is, the storyboard data may be converted in a file format such as ASCII, HTML, XML, and the like, and thus, if necessary, the user may convert the file to read the storyboard on a web.

Figure 3:
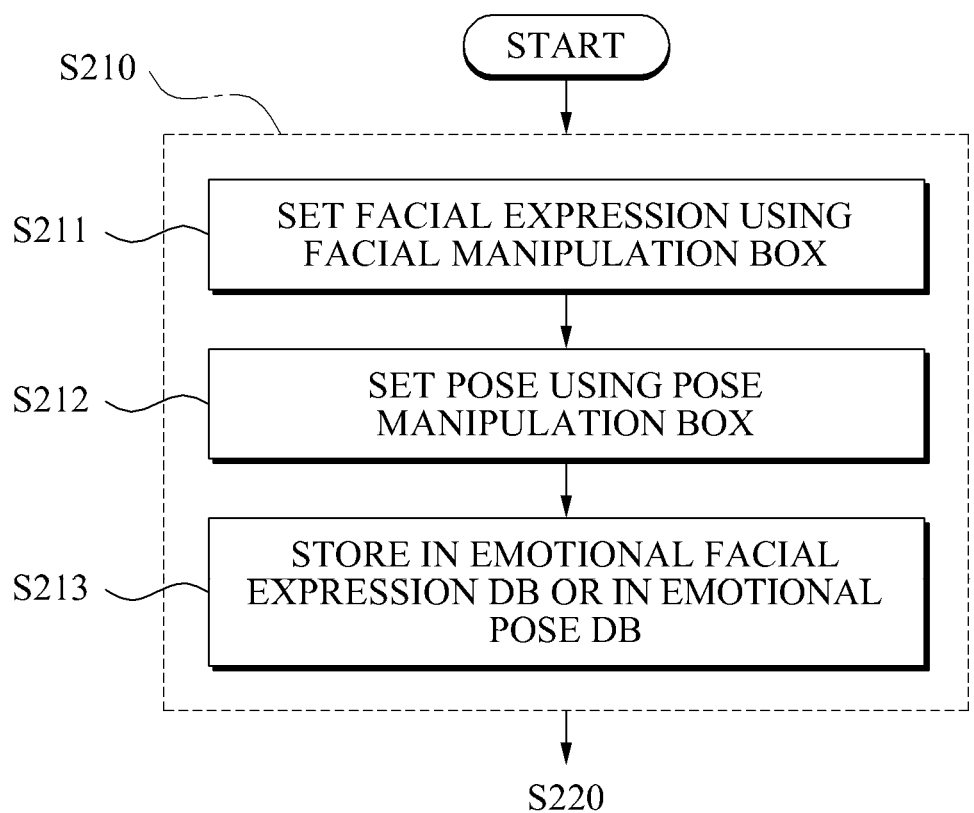
FIG. 3 shows a flowchart illustrating exemplary steps to produce and store a facial expression and a pose of a character according to one embodiment of the present invention.

FIG. 3 shows a flowchart illustrating exemplary steps to produce and store a facial expression and a pose of a character according to one embodiment of the present invention.

In operation S211, a user may read a character stored in advance from a database, and may set a facial expression using a facial manipulation box.

The facial manipulation box may separately manipulate eyebrows, a nose, a mouth, and the like of a face of the character, and may deftly express emotion by minutely manipulating each part. The facial expression manipulation box will be described in detail with reference to FIG. 4 later.

In operation S212, the user may set a pose using a pose manipulation box. The pose manipulation box may set details of the pose by separately controlling arms, legs, a head, and the like of the character, thereby accurately expressing the emotion.

In operation S213, the manipulated emotional facial expression and emotional pose are respectively stored in an emotional facial expression DB 140 and an emotional pose DB 141. Accordingly, the user may extract the previously produced pose whenever it is needed, and may compose a storyboard using the extracted pose.

Figure 4:
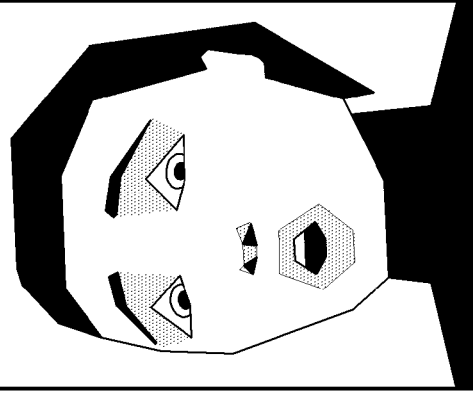
FIG. 4 shows an exemplary emotional facial expression producing unit according to one embodiment of the present invention.

FIG. 4 shows an exemplary emotional facial expression producing unit according to one embodiment of the present invention. As repicted, the emotional facial expression producing unit includes a basic facial expression button unit 410, a facial manipulation box 420, and a preview screen 430.

The basic facial expression button unit 410 stores emotions in advance as a single setting value, such as disappointed, frightened, kissing, sleeping, surprised, happy, angry, annoyed, talking, and the like, and thus, the user may produce a desired facial expression by merely selecting a button of the basic facial expression button unit 410.

The facial manipulation box 420 is an interface for separately controlling details of a facial expression. As depicted in FIG. 4, the facial manipulation box 420 may provide an interface for setting eyebrows, eyelids, a gaze, a mouth, a head, and the like. Also, the facial manipulation box 420 may enable the user to additionally control lips, an inclination of a face, and the like, besides the above-described details. In this instance, the facial manipulation box 420 may set the details precisely according to details, such as up, mid, down, and the like, thereby producing more detailed and deft facial expression and well expressing the emotion that the user desires.

The preview screen 430 displays a change of a facial expression in real time, while the user controls each detail of a face, thereby enabling the user to easily recognize the change of each of the details. As an example, when producing a surprised look, a degree of surprise may be variously set depending on a situation, such as a situation that a character is substantially surprised, a situation that a character slightly shows surprised look even when trying to hide the surprised look, and the like. In this instance, a position of eyebrows, a mouth (a size of an open mouth), and the like may be minutely controlled by controlling the facial manipulation box 420 and using the preview screen 430.

The storyboard generating method according to the exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A computer-implemented method for allowing a user to generate a storyboard including a character graphically depicting a particular facial expression of emotion and/or an emotion expressing pose to be portrayed by an actor, comprising:
   providing a user interface;
   providing an emotional facial expression producing unit and associated first database containing data defining a plurality of different basic facial emotion-expressing characters each having a combination of basic facial features which in the aggregate express a different basic emotion;
   providing an emotional facial expression producing unit and associated second database containing data defining a plurality of different basic emotion-expressing character poses each having a particular configuration of body part dispositions, the combination of which defines a different emotional expression;
   providing a preview screen viewable by the user;
   providing a first menu for enabling the user to select from said first database, via inputs to said interface, and to display on said preview screen a character having facial characteristics expressing a desired basic facial emotion;
   providing a second menu for enabling the user to select a particular manipulation of one or more of the facial characteristics of the selected and displayed character to produce a manipulated facial emotion-expressing character having a desired different facial emotion;
   providing another menu for enabling the user to select, via inputs to said interface, a basic emotion-expressing character pose for the displayed character, or to select adjustments to be made to particular character body part dispositions of the displayed character, and to manipulate the pose characteristics thereof to produce a desired different emotion-expressing posed character;
   providing a storage unit for storing data corresponding to the selected and displayed character or manipulated character; and
   using a processor of the computer to generate storyboard data including the stored character or manipulated character.

2. The computer-implemented method of claim 1, and further comprising:
   selectively combining the stored data corresponding to the displayed character or manipulated character with layout data and camera setup data associated with script data and/or subsidiary image data to develop the storyboard data.

3. The computer-implemented method of claim 1, further comprising:
   performing cartoon-rendering of the storyboard data to generate a cartoon-like image; and
   outputting the cartoon-like image.

4. The computer-implemented method of claim 1, further comprising:
   converting the storyboard data into one or more file formats; and storing the converted file.

5. A system including a computer processor for allowing a user to generate a storyboard character graphically depicting a particular facial expression of emotion and/or emotion expressing pose to be portrayed by an actor, comprising:
   a user interface;
   a storage unit;
   an emotion-expressing character producing unit including,
      an emotional facial expression database for storing basic facial emotion-expressing character data,
      an emotional pose database for storing said basic emotion-expressing posed character data,
      an emotional facial expression producing unit associated with said emotional facial expression database and having a first menu for enabling the user to select and store in said storage unit, via inputs to said interface, a character having facial characteristics expressing a basic facial emotion, the selected character corresponding to one of several characters represented by previously stored basic facial emotion-expressing character data, and having a second menu for enabling the user to select a particular manipulation of one or more of the facial characteristics of the selected character to produce and store in said storage unit desired different facial emotion-expressing character data representing a desired different facial emotion-expressing character, and
      an emotional pose producing unit having another menu for enabling the user to select, via inputs to said interface, a basic emotion-expressing character pose for the selected character having a particular configuration of body part dispositions, the combination of which defines the user's desired emotional expression, or to select from the menu adjustments to be made to particular character body part dispositions of the selected basic emotion-expressing posed character, and to thereby manipulate the data corresponding to selected pose characteristics thereof to produce and store in said storage unit a desired different emotion-expressing posed character; and a storyboard generating unit including a computer processor coupled to said interface, said storage unit, said emotional facial expression database and said emotional pose database, for enabling the user to input script data, and to extract said basic facial emotion-expressing character data and/or said different facial emotion-expressing character data from said emotional facial expression database and/or said storage unit, and/or to extract said basic emotion-expressing posed character data and/or said different emotion-expressing posed character data from said emotional pose database, and to combine the extracted data with subsidiary image data stored in said storage unit and including at least one of background data, clothing data, and prop data to develop storyboard data for use in generating a storyboard including a cartoon character graphically expressing a particular emotion and/or pose to be portrayed by an actor.

6. The system for allowing a user to generate a storyboard character graphically depicting a particular facial expression of emotion and/or emotion expressing pose to be portrayed by an actor as recited in claim 5, wherein said storage unit is coupled to the storyboard generating unit for storing layout data associated with the basic facial emotion-expressing character data or desired facial emotion-expressing character data, camera setup data, and said subsidiary image data.

7. The system for allowing a user to generate a storyboard character graphically depicting a particular facial expression of emotion and/or emotion expressing pose to be portrayed by an actor as recited in claim 6, wherein the layout data includes a facial expression of the emotion-expressing character or a layout image of a pose, and wherein the camera setup data includes a coordinate value for reproducing the facial expression or the pose and a setup value with respect to an angle.

8. The system for allowing a user to generate a storyboard character graphically depicting a particular facial expression of emotion and/or emotion expressing pose to be portrayed by an actor as recited in claim 6, wherein the storyboard generating unit decodes, into a three dimensional (3D) object, the emotion-expressing character and the subsidiary image data extracted from the storage unit.

9. The system for allowing a user to generate a storyboard character graphically depicting a particular facial expression of emotion and/or emotion expressing pose to be portrayed by an actor as recited in claim 5, wherein the storyboard generating unit includes a script input unit to receive the script data from a user and to display the script data on the storyboard.

10. The system for allowing a user to generate a storyboard character graphically depicting a particular facial expression of emotion and/or emotion expressing pose to be portrayed by an actor as recited in claim 5, wherein the user interface includes at least one of a keyboard, a touch screen, a mouse, and a pen mouse.

11. The system for allowing a user to generate a storyboard character graphically depicting a particular facial expression of emotion and/or emotion expressing pose to be portrayed by an actor as recited in claim 5, further comprising:

a cartoon producing unit coupled to the storyboard generating unit to perform cartoon-rendering of the storyboard data to thereby generate a cartoon-like image; and an output unit coupled to the cartoon producing unit to output the image.

12. The system for allowing a user to generate a storyboard character graphically depicting a particular facial expression of emotion and/or emotion expressing pose to be portrayed by an actor as recited in claim 5, further comprising:

a file converting unit coupled to the storyboard generating unit to convert the storyboard data into one or more file formats; and a file storage unit coupled to the file converting unit to store the storyboard data converted into the one or more file formats.

13. A system for allowing a user to generate a storyboard character graphically depicting a particular facial expression of emotion and/or emotion expressing pose to be portrayed by an actor as recited in claim 5 wherein said emotion-expressing character producing unit further includes means providing a preview screen for displaying a selected character and/or change in the facial expression of the selected character as the user manipulates the selected facial characteristics of the basic facial emotion-expressing character.

* * * * *